(12) United States Patent
Clinciu

(10) Patent No.: US 8,435,012 B2
(45) Date of Patent: May 7, 2013

(54) WHEEL-MOUNTED AIR COMPRESSOR AND METHODS OF USE

(76) Inventor: Dan A. Clinciu, Denver, CO (US)

( * ) Notice: Subject to any disclaimer, the term of this patent is extended or adjusted under 35 U.S.C. 154(b) by 361 days.

(21) Appl. No.: 12/952,687

(22) Filed: Nov. 23, 2010

(65) Prior Publication Data

US 2011/0129360 A1   Jun. 2, 2011

Related U.S. Application Data

(60) Provisional application No. 61/264,872, filed on Nov. 30, 2009.

(51) Int. Cl.
*F04B 35/06* (2006.01)

(52) U.S. Cl.
USPC .......................................... 417/233; 152/418

(58) Field of Classification Search .................. 417/231, 417/233; 152/415, 418, 419, 421; 92/140
See application file for complete search history.

(56) References Cited

U.S. PATENT DOCUMENTS

| | | | |
|---|---|---|---|
| 1,887,715 A * | 11/1932 | Hester | 417/233 |
| 3,495,766 A * | 2/1970 | Hinkle | 417/380 |
| 4,193,437 A | 3/1980 | Powell | |
| 4,196,414 A | 4/1980 | Muller | |
| 4,353,322 A | 10/1982 | Weglin et al. | |
| 4,431,043 A | 2/1984 | Goodell et al. | |
| 4,470,506 A | 9/1984 | Goodell et al. | |
| 4,498,515 A | 2/1985 | Holtzhauser et al. | |
| 4,510,979 A | 4/1985 | Hjorth-Hansen | |
| 4,529,019 A | 7/1985 | Blevins et al. | |
| 4,538,659 A | 9/1985 | Adelman et al. | |
| 4,582,108 A | 4/1986 | Markow et al. | |
| 4,763,709 A | 8/1988 | Scholer | |
| 4,987,937 A | 1/1991 | Nowicke | |
| 5,325,902 A | 7/1994 | Loewe et al. | |
| 5,387,069 A | 2/1995 | Asaumi et al. | |
| 5,452,753 A | 9/1995 | Olney | |
| 5,556,489 A | 9/1996 | Curlett et al. | |
| 5,558,730 A | 9/1996 | Olney et al. | |
| 5,591,281 A | 1/1997 | Loewe | |
| 5,616,196 A | 4/1997 | Loewe | |
| 5,765,601 A | 6/1998 | Wells et al. | |
| 5,865,917 A | 2/1999 | Loewe | |
| 5,874,138 A | 2/1999 | Fitzpatrick | |
| 5,975,174 A | 11/1999 | Loewe | |
| 6,212,464 B1 | 4/2001 | Skotnikov | |
| 6,247,513 B1 | 6/2001 | Lukins | |
| 6,269,691 B1 | 8/2001 | Sowatzke et al. | |

(Continued)

*Primary Examiner* — Peter J Bertheaud
*Assistant Examiner* — Dnyanesh Kasture
(74) *Attorney, Agent, or Firm* — Leyendecker and Lemire

(57) ABSTRACT

The disclosure is generally directed to a wheel-mounted, centrifugally activated, air compressor that will automatically inflate an inflatable vehicle tire back to the proper pressure level when small under-inflation situations occur (e.g., the occurrence of small-to-medium air leaks in a tire). Moreover, the device can be easily attach or fitted into the design of a steel or aluminum wheel, or fitted into a hubcap without modifying the standard design of the wheel-hub assembly. The wheel-mounted device includes a mounting base, cylinder assemblies, and spring-biased centrifugal arms, and is designed to convert changes in the centrifugal force felt by the centrifugal arms as wheel rotation accelerates or decelerates/stops into varying force exerted on positive-displacement pistons. This in turn actuates positive-displacement pumping action at the cylinder assemblies, each of which can provide a short burst of pressurized air into the charging line connected into the associated tire with each compressive stroke.

20 Claims, 6 Drawing Sheets

U.S. PATENT DOCUMENTS

| | | |
|---|---|---|
| 6,286,565 B1 | 9/2001 | Pike |
| 6,445,287 B1 | 9/2002 | Schofield et al. |
| 6,736,176 B2 | 5/2004 | Teratani |
| 6,887,173 B2 | 5/2005 | Lacroix et al. |
| 6,896,020 B1 | 5/2005 | Summers |
| 6,956,471 B2 | 10/2005 | Tamimi et al. |
| 6,976,391 B2 | 12/2005 | Maquaire |
| 7,000,667 B2 | 2/2006 | Brahler |
| 7,017,642 B2 | 3/2006 | Brahler |
| 7,029,530 B2 | 4/2006 | Pyzio |
| 7,207,365 B2 | 4/2007 | Nelson et al. |
| 7,225,849 B2 | 6/2007 | Routt et al. |
| 7,273,082 B2 | 9/2007 | White et al. |
| 7,302,837 B2 | 12/2007 | Wendte |
| 2001/0042580 A1 | 11/2001 | Teratani |
| 2003/0032507 A1 | 2/2003 | Lacroix et al. |
| 2004/0060509 A1 | 4/2004 | Pyzio |
| 2004/0173296 A1 | 9/2004 | White et al. |
| 2004/0238093 A1 | 12/2004 | Nelson et al. |
| 2004/0258534 A1 | 12/2004 | Patel |
| 2005/0194080 A1 | 9/2005 | White et al. |
| 2007/0068238 A1 | 3/2007 | Wendte |
| 2009/0107602 A1 | 4/2009 | Kabakov |
| 2009/0241655 A1 | 10/2009 | Ingram et al. |
| 2009/0294005 A1 | 12/2009 | Firestone |
| 2010/0212798 A1 | 8/2010 | Bothe |

\* cited by examiner

WHEEL-MOUNTED AIR COMPRESSOR AND METHODS OF USE

CROSS-REFERENCE TO RELATED APPLICATIONS

This patent application claims the benefit of U.S. Patent Application 61/264,872, which was filed on Nov. 30, 2009, and is hereby incorporated by reference for all purposes.

BACKGROUND

There has been a long-recognized need to have a means to automatically maintain the air pressure in inflatable tires on motor vehicles to compensate for slow leakage and/or changes in the atmospheric environment; i.e., air temperature and pressure fluctuations. Existing products commonly found in the marketplace include Central Tire Inflation System, AIRGO Tire Maintenance System (TMS), Meritor Tire Inflation System (MTIS), PressureGuard system, and TIRE-MAAX system. Such tire-inflation systems detect when the air pressure in a particular tire has dropped and inflate that tire back to the proper level as long as there is only a minor air leak.

For example, the AIRGO Tire Maintenance System (TMS) is a "smart" system for tractor trailers that monitors tire pressure and inflates tires as necessary to keep pressure at the right level. It uses air from the trailer's brake-supply tank to inflate the tires.

The Meritor Tire Inflation System (MTIS) is also designed for use on tractor trailers. It uses compressed air from the trailer to inflate any tire that falls below its appropriate pressure. Air from the existing trailer air supply is routed to a control box and then into each axle. The air lines run through the axles to carry air through a rotary union assembly at the spindle end in order to distribute air to each tire. If there is significant air-pressure loss, then an indicator light informs the driver.

The PressureGuard system routes air from the trailer's air supply through the axles, then to the wheel hubs, and then to the tire valves.

The TIREMAAX system uses the trailer's air supply to maintain a specific level of tire inflation. When the system detects low pressure, it signals the operator/driver, and then directs air from the trailer air tank in the specific tire needing inflation.

While these available tire inflation systems vary in design, they share some common elements. This type of system uses air from the same compressor that supplies air to the brakes or from the trailer's brake supply tank to inflate the tires. The air lines run through the axles to carry air through a rotary union assembly at the spindle end in order to distribute air to each tire. However, due to very high complexity and high costs, the above listed tire inflation systems are made almost exclusively for large commercial vehicle, tractor trailers and military vehicles.

Other tire-inflation systems that are oriented toward the consumer market are the EnTire system, Cycloid AirPump system, Bridgestone Air Hub system, and The Pirelli Safety Wheel System.

The EnTire system uses a valve that allows intake of air from the atmosphere. The system then pumps the air into the under-inflated tire using a peristaltic-pump action, with the goal of maintaining a constant specific pressure in the tire.

The Cycloid AutoPump system has a small, wheel-hub-mounted pump that is powered by the turning of the wheels. Mounted on the wheel hub behind the center cap, the pump adds air through a check-valved tube that travels from the wheel hub to the tire cavity, and can add up to 2.5 psi per hour to an underinflated or leaking tire. In addition, the pump's self-contained electronics continuously monitor tire pressure, tire temperature (so it won't overpressure the tire), wheel rotations, and will send a signal to an internal receiving antenna if a large pressure loss (2 to 3 psi) is detected.

The Bridgestone Air Hub system (from Bridgestone Cycle of Japan) uses a rotating air pump that replenishes air in the tire as one pedals a bicycle. Like the EnTire system, it keeps the air in the tires at a constant pressure level. The air pump is located in the wheel hub and is run by rotating the wheel.

The Pirelli Safety wheel System uses a monitoring system along with a special rim and an internal tube containing compressed air. It also has a valve to regulate the pressure between the tube and the tire.

The main problem with these existing products is that the wheel-hub-mounted pump (peristaltic pump), which is powered by the turning of the wheels, requires substantial modification to the standard design of the wheel-hub and wheel assembly, as well as a special rim design for the wheel. Another problem with these existing tire-inflation systems is that the wheel and the compressor are designed to be an integral part of the vehicle and cannot be removed and reinstalled on another vehicle.

What is needed is a simple design for a small, individual-wheel-based air compressor/regulator for tire air pressure, which can be easily removably coupled to a wheel-and-tire assembly, as well as can be easily coupled to other similarly-sized wheel-and-tire assemblies.

DETAILED DESCRIPTION

Overview

Figure 1:
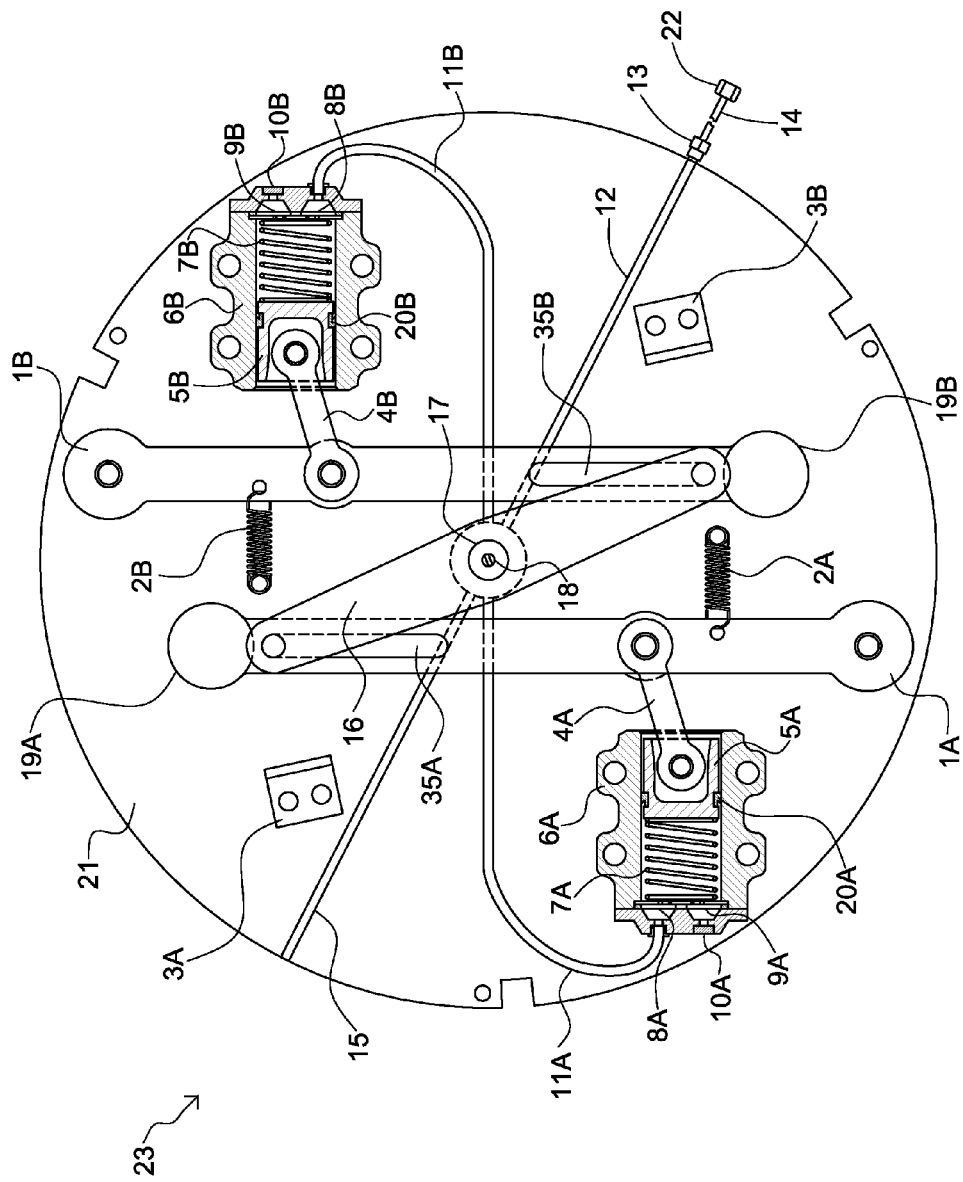
FIG. 1 depicts a front view of one embodiment of a wheel-mounted, centrifugally activated air compressor assembly, minus an external cover/hub cap that would cover this assembly during a practical application in many embodiments.

The present inventive disclosure is generally directed to a device incorporating a wheel-mounted air compressor that will automatically inflate an inflatable vehicle tire back to the proper pressure level when small under-inflation situations occur (e.g., the occurrence of small-to-medium air leaks in a tire). Moreover, the device can be easily attach or fitted into the design of a steel or aluminum wheel, or fitted into a hubcap without modifying the standard design of the wheel-hub assembly. In many embodiments, the device is a stand-alone apparatus that is not an integral part of a vehicle's design, and can be easily removed and reinstalled, or installed on another vehicle altogether. Finally, the device enjoys a relatively simple, removably coupled design such that it can be manufactured for a relatively low cost, is lightweight, and relatively maintenance-free.

The wheel-mounted device includes a mounting base, cylinder assemblies, and spring-biased centrifugal arms, and is designed to convert changes in the centrifugal force felt by the centrifugal arms as wheel rotation accelerates or decelerates/stops into varying force exerted on positive-displacement pistons. This in turn actuates positive-displacement pumping action at the cylinder assemblies, each of which can provide a short burst of pressurized air into the charging line connected into the associated tire with each compressive stroke.

Terminology

The terms and phrases as indicated in quotes (" ") in this section are intended to have the meaning ascribed to them in this Terminology section applied to them throughout this document, including the claims, unless clearly indicated otherwise in context. Further, as applicable, the stated definitions are to apply, regardless of the word or phrase's case, to the singular and plural variations of the defined word or phrase.

The term "or", as used in this specification and the appended claims, is not meant to be exclusive; rather, the term is inclusive, meaning "either or both".

References in the specification to "one embodiment", "an embodiment", "a preferred embodiment", "an alternative embodiment", "a variation", "one variation", and similar phrases mean that a particular feature, structure, or characteristic described in connection with the embodiment is included in at least an embodiment of the invention. The appearances of the phrase "in one embodiment" and/or "in one variation" in various places in the specification are not necessarily all meant to refer to the same embodiment.

The term "couple" or "coupled", as used in this specification and the appended claims, refers to either an indirect or a direct connection between the identified elements, components, or objects. Often the manner of the coupling will be related specifically to the manner in which the two coupled elements interact.

The term "removable", "removably coupled", "readily removable", "readily detachable", and similar terms, as used in this patent application specification (including the claims and drawings), refer to structures that can be uncoupled from an adjoining structure with relative ease (i.e., non-destructively and without a complicated or time-consuming process) and can also be readily reattached or coupled to the previously adjoining structure.

Directional and/or relational terms such as, but not limited to, left, right, nadir, apex, top, bottom, vertical, horizontal, back, front, and lateral are relative to each other, are dependent on the specific orientation of an applicable element or article, are used accordingly to aid in the description of the various embodiments, and are not necessarily intended to be construed as limiting.

As applicable, the terms "about" and "generally" as used herein unless otherwise indicated means a margin of ±20%. Also, as applicable, the term "substantially" as used herein unless otherwise indicated means a margin of ±10%. It is to be appreciated that not all uses of the above terms are quantifiable such that the referenced ranges can be applied.

First Embodiment—A Wheel-Mounted, Centrifugally Activated Air-Compressor Device

Figure 2:
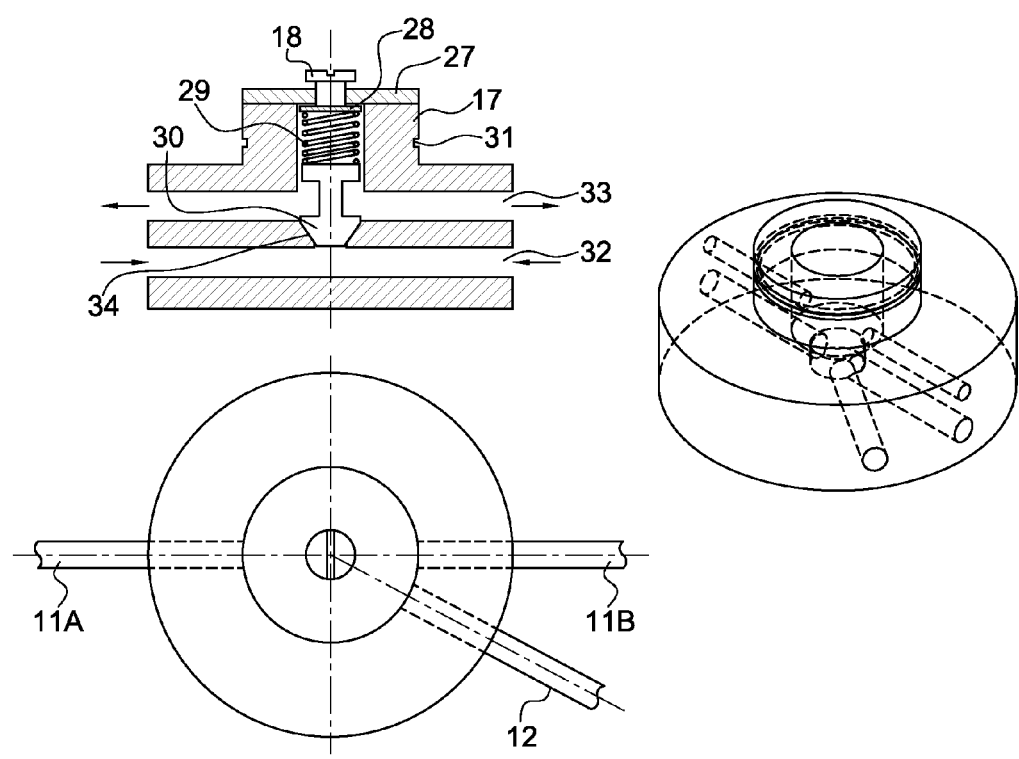
FIG. 2 depicts one embodiment of the centrally mounted pressure-relief valve/regulator used in an embodiment of a wheel-mounted, centrifugally activated air-compressor assembly.
Figure 3:
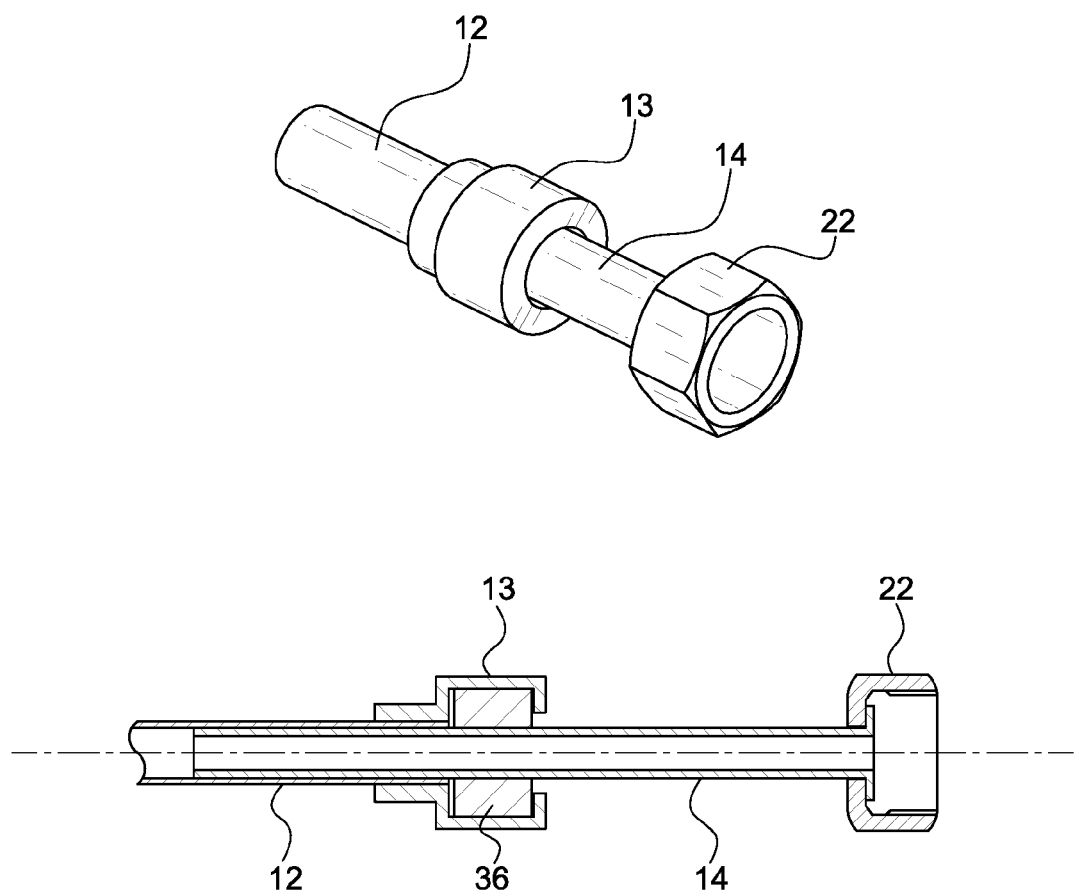
FIG. 3 depicts one embodiment of the quick-disconnect system between the wheel-mounted, centrifugally activated air compressor and a connected tire's fill valve/Schrader valve.
Figure 4:
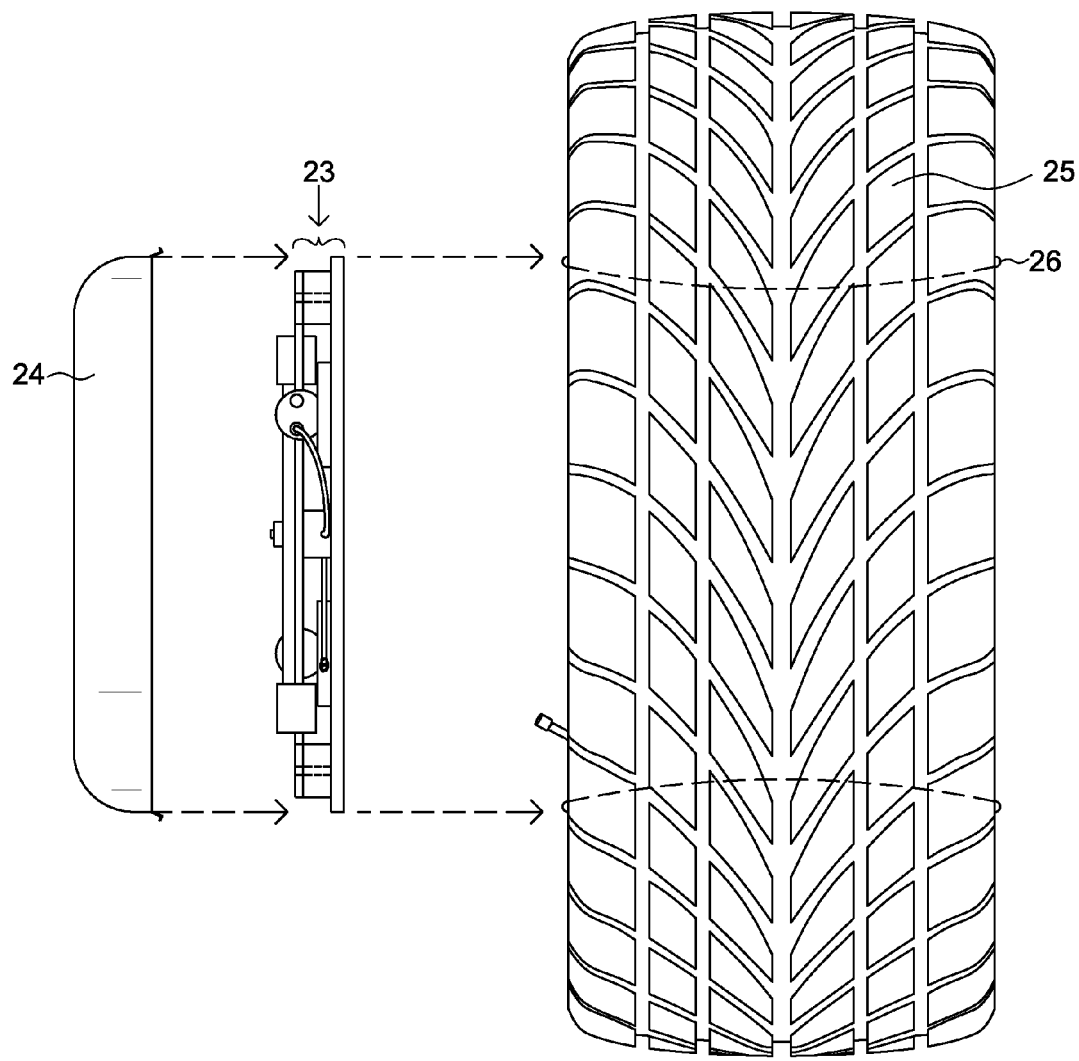
FIG. 4 depicts one embodiment of a wheel-mounted, centrifugally activated air-compressor assembly with an enclosure housing installed on a wheel rim and tire assembly.
Figure 5:
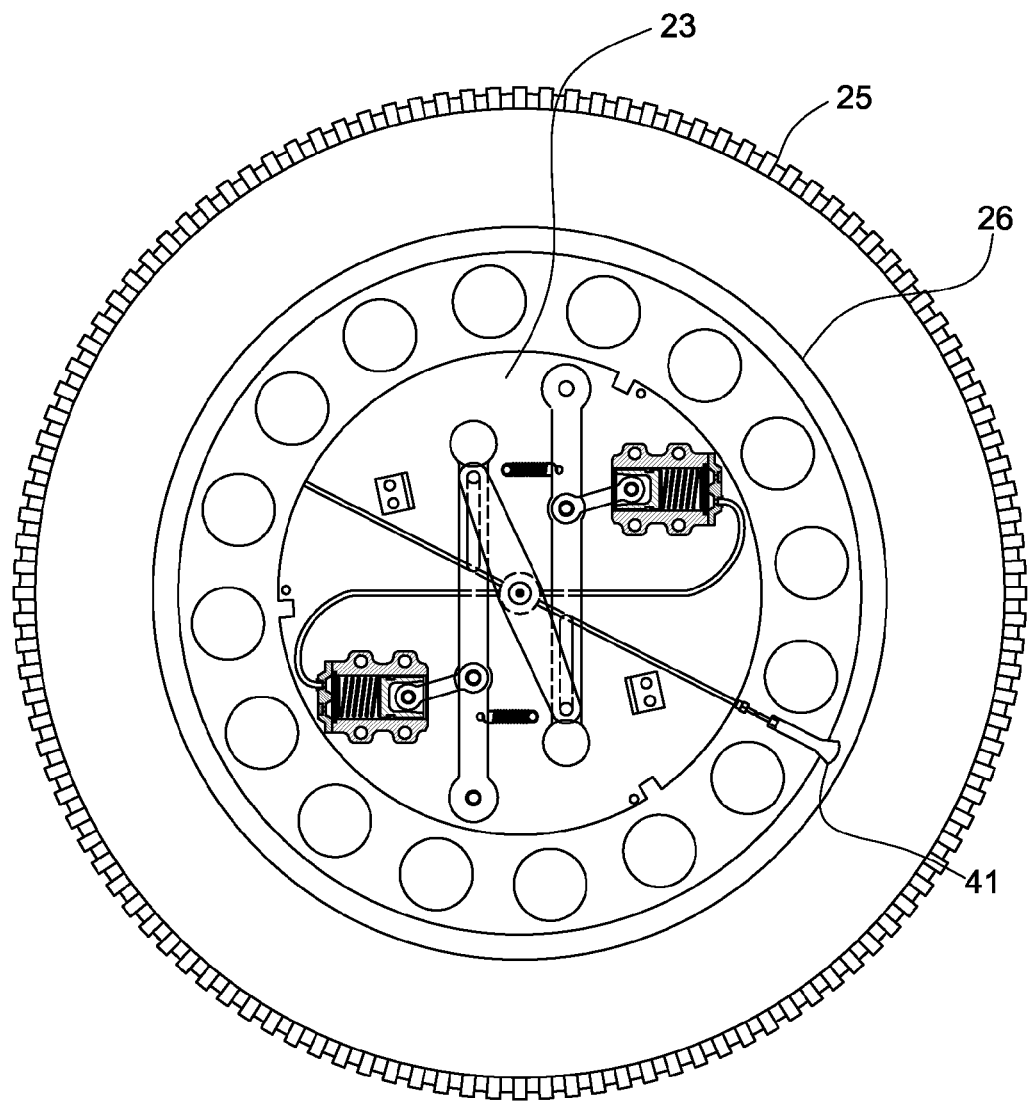
FIG. 5 depicts one embodiment of a wheel-mounted, centrifugally activated air-compressor assembly installed on a wheel rim and tire assembly, but the enclosure housing removed/uninstalled.
Figure 6:
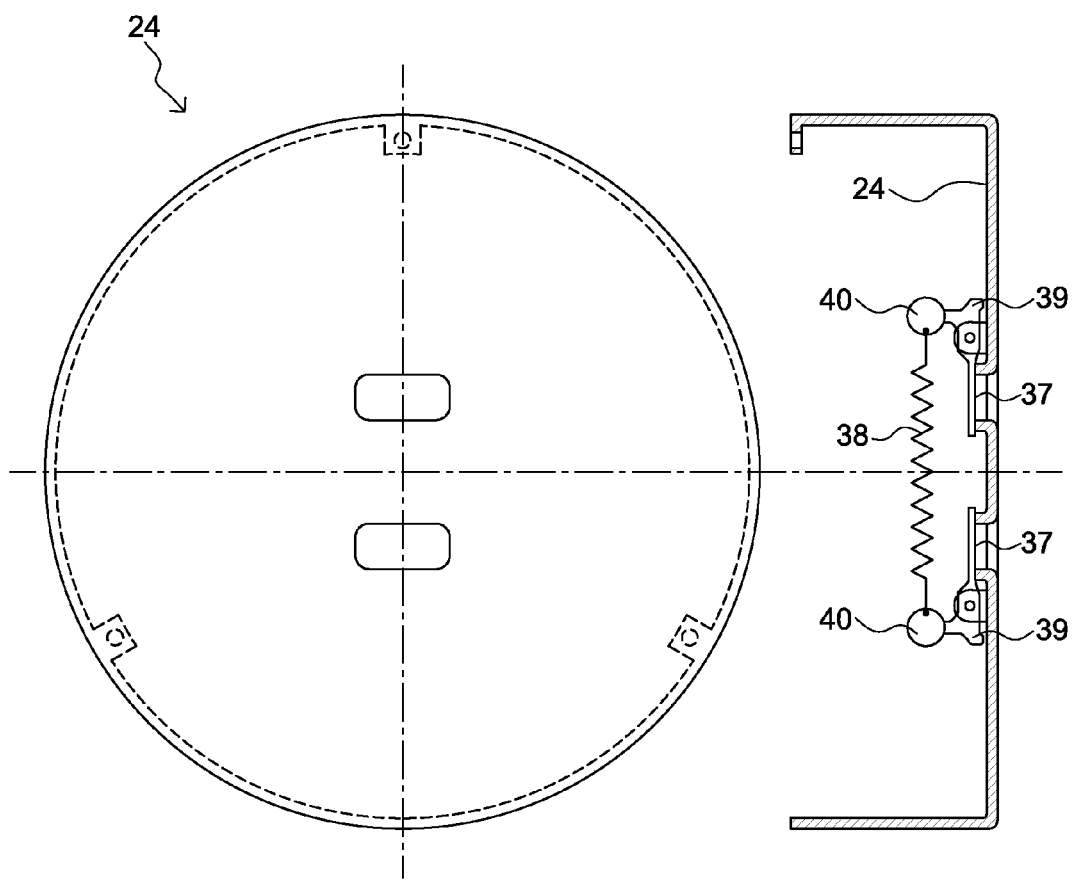
FIG. 6 depicts one embodiment of an enclosure housing for one embodiment of a wheel-mounted, centrifugally activated air-compressor assembly, where this embodiment of an enclosure housing has vent ports that open as centrifugal forces increase.

This embodiment is directed generally to a device comprising a wheel-mounted, centrifugally activated air-compressor and regulator assembly. Refer to FIGS. 1-6.

The mounting base 21 of the device 23 is comprised of a structure to which all the compressor's components are mounted to. In this embodiment, the mounting base 21 represents the chassis of the wheel-mounted air compressor 23. In many embodiments, the mounting base 21 is adapted to be fitted into the design of a steel or aluminum wheel rim 26, or can be part of a standard hubcap 24 (made of plastic or metal) that can be also detachably coupled to a wheel rim 26. Of course, the hubcap enclosure 24 can have ornamental features that are not tied to its functionality. In other embodiments, the mounting base 21 can also be a separate component which is removably attached to a steel or aluminum wheel rim 26.

The mounting base 21 can be installed in an enclosure 24 for easy installation and removal/replacement from the wheel rim 26. Such an enclosure 24 protects the internal components, such as the air-compressor cylinder assemblies 6A, 6B and other components, against rapid wear or damage by preventing dust and impurities from being introduced into the air-compressor area. In many embodiments, the enclosure 24 is fitted with a vent or an air-intake vacuum valve (not shown in the figures), each equipped with an air filter to keep out dust and other debris that can otherwise cause wear damage to cylinder components 6A, 6B, and the enclosure 24 can also be equipped with an optional snorkel valve to prevent water from entering the enclosure 24. See, for example, FIG. 6, for one embodiment of an enclosure housing 24 equipped with a plurality of centrifugally actuated vent ports 37. In such an embodiment, as the wheel 25, 26 turns with increasing speed, the centrifugal forces exerted on port centrifugal weights 40, causing the weights and their associated port-pivot assemblies 39 to pivot outwardly against spring 38 tension (which normally holds the ports closed) and thus open the vent ports 37. In some variations of this embodiment, the vent ports 37 are also equipped with an air filter (not shown in the figures) to keep out dust and debris and such.

In some embodiments, the enclosure 24 is coupled to the mounting base 21 using metal clips. In other embodiments, the enclosure 24 is coupled to the mounting base 21 using threaded fasteners. Likewise, the mounting base, in some embodiments is coupled to a wheel rim using metal clips, which are sometimes combined with a spring retention ring to further secure the coupling by exerting outward force on the metal clips. In still other variations, the mounting base 21 is coupled to the wheel rim using threaded fasteners.

In a typical embodiment, each spring-biased centrifugal arm 1A, 1B is comprised of a long arm and a weight 19A, 19B mounted at the opposite side of the pin joint, which connects the centrifugal arm 1A, 1B to the mounting base 21. This configuration allows the centrifugal arm 1A, 1B to transform the centrifugal force into a straight-line motion to be applied to the associated piston's 5A, 5B connecting rod 4A, 4B. The two centrifugal arms 1A, 1B are coupled via a center-mounted connecting arm 16, which is designed to pivot freely at its center point 17, 18. Each centrifugal arm 1A, 1B is connected to its portion of the connecting arm 16 using a pin joint disposed in an elongated opening 36A, 36B in the associated end of the centrifugal arm 1A, 1B in order to allow the centrifugal-arm-to-connecting-arm joint to slide freely along the opening or track during operation. The purpose of the connecting arm 16 is to control the movement of the centrifugal arms 1A, 1B, allowing only a symmetric movement of the centrifugal arms (relative to each other) in order to prevent the centrifugal arms 1A, 1B and inertial weights 19A, 19B from going out-of-balance.

In many embodiments, the center of the connecting arm 16 employs a pressure-relief/regulator valve body 17, 18, which is mounted at the center of the mounting base 21, as a pin joint about which the connecting arm 16 can freely pivot. In some embodiments, the pressure-relief/regulator valve 17 is user-adjustable via and adjustment screw 18 located at the top of the valve body 27 to facilitate different desired operating parameters (see FIG. 2). In most embodiments, the pressure-relief/regulator valve 17, 18 is comprised of a spring-valve mechanism 28, 29, 30 that will automatically release the compressed air from the discharge lines 11A, 11B from the cylinders 6A, 6B into the atmosphere when the pressure exceeds pre-determined limits, thus preventing the over-inflation of the tire 25. In some variations, an additional spring (not shown in the figures) can be added over the pressure-relief/regulator valve body 17 and connected between the mounting base 21 and the connecting arm 16 in order to help facilitate the connecting arm's 16 return to the initial position when the mounting base 21 stops rotating. In still more embodiments, the connecting arm 16 is centrally mounted over the pressure-relief/regulator valve body 17, 27, which in some variations can also have an annular groove disposed around the upper valve body 17, wherein said groove can receive a retaining ring to aid in keeping the connecting arm 16 in place.

Turning to the cylinder assemblies 6A, 6B, in many embodiments, each cylinder assembly 6A, 6B is comprised of a cylinder 6A, 6B, a piston 5A, 5B with a cup-washer 20A, 20B made of rubber or other appropriate elastomeric material (or alternatively, a metal piston ring), a piston spring 7A, 7B disposed at the bottom of the cylinder 6A, 6B to act against the piston 5A, 5B head, an air-intake valve 9A, 9B, an air-discharge valve 8A, 8B, and an air-intake air filter 10A, 10B. The piston 5A, 5B is coupled to its associated centrifugal arm 1A, 1B via the piston pin and connecting rod 4A, 4B. In some variations of this embodiment, the air-intake valves are installed in the piston 5A, 5B head instead of the cylinder 6A, 6B head; however, in such a case, the air-compressor enclosure 24 must be fitted with a vent or air-intake valve equipped with an air filter, since an individual air filter for each cylinder 6A, 6B would no longer be effective or practicable.

Once assembled and installed, the wheel-mounted, centrifugally activated air-compressor and regulator assembly 23 operates as follows: When the associated vehicle starts to move, thus turning the wheels 25, 26, the mounting base 21 will start to turn and create a centrifugal force to cause the two inertial weights 19A, 19B on each centrifugal arm 1A, 1B to move outwardly, pushing the associated piston 5A, 5B via the connecting rod 4A, 4B and compressing the air. The compressed air is then made available to inflate the tire 25 through the small-diameter air line 12 and quick-disconnect fitting 13 attached via a flexible air line 14, seal ring 36 (which in many embodiments is made or rubber or some other elastomer), and coupling nut 22 to the tire valve stem/Schrader valve 41. The quick-disconnect 13, 14, 36 is designed to be a safety feature to allow for immediate separation of the entire air-compressor device 23, 24 air line from the tire 25 in the event the wheel-mounted air compressor mounting 21 fails. This prevents the hubcap-enclosed air-compressor device 23, 24 from being dragged by the vehicle. The quick-disconnect fitting, in some embodiments, is located on the flexible air line 12, between the pressure-relief/regulator valve 17, 18 and a tire's 25 fill/Schrader valve 41. In those embodiments, the air line 14 is sized such that it can be snuggly slid inside of the larger-diameter air line 12 in order to make it easier to connect the coupling nut 22 directly onto the tire's 25 fill/Schrader valve 41. The rubber seal 36 is provided to maintain the integrity of the air seal from such an interference fit when subjected to normal operating air pressure. In some variations of this embodiment, the quick-disconnect fitting is designed to be permanently attached to the air line 12.

In many embodiments, the wheel-mounted air compressor 23 includes a centrifugal-arm-motion limit 3A, 3B for each centrifugal arm 1A, 1B to provide a hard limit on centrifugal-arm 1A, 1B movement during the air-compression stroke in order to prevent over-travel and potential mechanical jamming and damage to piston 5A, 5B and cylinder 6A, 6B components. In some embodiments, each hard limit member 3A, 3B has a rubber or plastic surface that makes contact with the traveling centrifugal arm 1A, 1B.

During the compression stroke, each piston 5A, 5B moves toward the top dead center position, and as it does so, it compresses the air in the cylinder 6A, 6B and expands the diameter of its respective cup washer 20A, 20B, which in turn seals the space between the piston 5A, 5B and its cylinder 6A, 6B to stop/prevent any air leaks. The pressure created during this compression stroke causes each cylinder's respective air-discharge valve 8A, 8B (which is normally biased in a closed position) to open and allow the compressed air to flow into the air line 11A, 11B that ultimately supplies the associated tire 25 via the quick disconnect 13, 14, 36, 22, which is coupled to the tire's spring-loaded fill/Schrader valve 41.

When the wheel 25, 26 stops, thus removing the centrifugal force, the centrifugal arms 1A, 1B will move inward according the spring 2A, 2B bias, which in turn will pull the pistons 5A, 5B in the cylinders 6A, 6B back via the connecting rod 4A, 4B to the bottom dead center position. It should be noted, however, that one skilled in the art will appreciate that other mechanical biasing mechanisms known in the art can be used in place of the spring 2A, 2B, and are thus contemplated in this disclosure. As each piston 5A, 5B returns to its respective bottom dead center position, it will create a relative vacuum, causing the respective air-intake valve 9A, 9B (which is normally biased in a closed position) to open and drawing air through the associated air filter 10A, 10B and into the cylinder 6A, 6B. The piston springs 7a, 7B, which are disposed within the cylinder 6A, 6B and are set against the their respective piston heads, help the pistons 5A, 5B return to their bottom dead center positions.

It should be appreciated by one skilled in the art that the design and placement of internal components are intended to substantially maintain a level of symmetry within the device to prevent undue vibration and instability as the wheel 25, 26 turns. To this end, there is a counter-weight member 15 designed to compensate for the air-supply line 12, 13, 14 emanating from only one side of the central pressure-relief/regulator valve. The counter weight can be as simple as an equal amount of unused air tubing of the same type used to supply air to the tire 25.

The embodiment and variations described herein largely are focused on having two centrifugally driven, piston-cylinder assemblies 4A, 5A, 6A; 4B, 5B, 6B. However, one skilled in the art would appreciate the prospect of including other numbers of piston-cylinder assemblies within the wheel-mounted air-compressor assembly. Generally, such added numbers are kept to multiples of two in order to minimize the complexity of the inter-workings of the centrifugal arms 1A, 1B and to minimize issues pertaining to unwanted vibrations due to a lack of symmetry within the device's structure as it rotates at certain frequencies.

Second Embodiment—A Method of Making a
Wheel-Mounted, Centrifugally Activated
Air-Compressor Device This embodiment is directed generally to a method for making an air-compressor for mounting and use on a wheel. Refer to FIGS. 1-6. In one embodiment, the method comprises the steps of:

Providing a mounting base 21, wherein the mounting base 21 is adapted to be coupled to the wheel rim 26 of a wheel that comprises an inflatable tire 25;

Providing a first and a second air-compressor cylinder assembly 6A, 6B, with each air-compressor cylinder assembly 6A, 6B fixedly coupled to the mounting base 21 and including: a cylinder housing 6A, 6B, an air-intake valve 9A, 9B that is spring-biased to be normally in the closed position, an air filter 10A, 10B adapted to remove dust and particulate from air entering through said air-intake valve 9A, 9B, an air-discharge valve 8A, 8B that is spring-biased to be normally in the closed position, a piston 5A, 5B diametrically sized to closely fit inside of the bore of the cylinder housing 6A, 6B, the piston 4A, 4B having a sealing ring 20A, 20B disposed around its circumference adapted to prevent air leakage during air-compression operations and the piston 5A, 5B coupled to a piston connecting rod 4A, 4B, and a spring 7A, 7B diametrically sized to closely fit in the cylinder 6A, 6B bore, and mechanically biased to oppose the compression piston stroke from the piston 5A, 5B inserted into the cylinder 6A, 6B bore;

Providing a first and a second centrifugal arm 1A, 1B, with each centrifugal arm 1A, 1B associated with the first and second cylinder housings 6A, 6B, respectively, and including: a rotatable coupling at one end to the mounting base 21, a rotatable piston-drive coupling to an associated piston connecting rod 4A, 4B, an inertial weight 19A, 19B disposed on the opposite end relative to the end rotatably coupled to the mounting base 21, an elongated aperture 35A, 35B disposed on the end associated with the inertial weight 19A, 19B, and a coupling point adapted to receive one end of an associated resistance spring 2A, 2B, the associated resistance spring 2A, 2B fixedly coupled to the mounting base 21 and adapted to oppose centrifugal forces exerted against the inertial-weighted end 19A, 19B of the centrifugal arm 1A, 1B (although one skilled in the art will appreciate that other mechanical biasing mechanisms known in the art can be used in place of the spring 2A, 2B, and are contemplated in this disclosure);

Providing a connecting arm 16, centrally disposed on and rotatably coupled to the mounting base 21, wherein each end of said connecting arm 16 is slidably coupled to the elongated aperture 35A, 35B of a centrifugal arm 1A, 1B;

Providing a pressure-relief/regulator valve 17, 18, 27, 28, 29, 30;

Providing a first and a second air-discharge line 11A, 11B, each coupled on one end to the first and second cylinder housing 6A, 6B, respectively, and each coupled on the other end to the pressure-relief/regulator valve 17, 18, 27, 28, 29, 30;

Providing a third air-discharge line 12 coupled on one end to the pressure-relief valve/regulator 17, 18, 27, 28, 29, 30 and coupled on the other end to a quick-disconnect coupling 13, 14, 36, 22 adapted to couple to an inflatable-tire valve; and Providing a counter-balance weight 15 of substantially the same mass as the third air-discharge line 12 and said quick-disconnect 13, 14, 36, wherein the counter-balance weight 15 is disposed on the mounting base 21 on the opposite side relative to the third air-discharge line 12 and the quick-disconnect 13, 14, 36 such that the potential for harmonics during wheel rotation are mitigated.

This embodiment can be enhanced by further comprising the step of providing an enclosure housing 24 that is sized and shaped to cover the air-compressor components on the mounting base 21 such that the enclosed air compressor 23, 24 is detachably mountable over the rim of a wheel 26. This variation can be further enhanced wherein the enclosure housing 24 is coupled to the mounting base 21 and the wheel rim 26 using a plurality of metal clips or using a plurality of threaded fasteners.

This embodiment can be enhanced by further comprising the step of providing the enclosure housing 24 with at least one centrifugally activated vent port 37, with each centrifugally activated vent port 37 comprising:

At least one pivotable vent port cover 39, wherein each of pivotable vent port cover's pivot point is fixed on the enclosure housing 24, and wherein each of the pivotable vent port cover 39 has a centrifugal weight 40 coupled to the distal end of said pivotable vent cover 39, relative to the portion that actually covers a vent port opening 37 in the enclosure housing 24; and At least one port-closing spring 38, wherein each port-closing spring 38 is coupled to the centrifugal-weighted end 40 of the at least one pivotable vent port cover 39, and biases said pivotable vent port cover 37 in the closed position;

Whereby during wheel-rotating operations, the centrifugal weight(s) 40 will cause the pivotable vent port cover(s) 39 to tilt outward again spring 40 tension and thus open the vent ports 37.

A variation of this embodiment can include air-filter media (not shown in the figures) installed for each of the vent port openings 37 of said enclosure housing 24, wherein the air-filter media is adapted to entrap dust and other debris from the incoming air stream during wheel-rotating operations.

This embodiment can be further enhanced wherein the counter-balance weight 15 is an effective amount of tubing substantially equal to the amount and mass of the third air-discharge line 12 and said quick-disconnect 13, 14, 36.

This embodiment can be further enhanced wherein the coupling of the mounting base 21 to the wheel rim 26 is accomplished using a plurality of metal clips adapted to create an interference fit with the wheel rim 26. This variation can be enhanced by further comprising the step of providing a spring retention ring in conjunction with the plurality of metal clips, the spring retention ring being coupled to the interior side of each metal clip in order to exert outward force to enhance the coupling to the wheel rim 26. Alternatively, in another enhancement to this embodiment, the coupling of the mounting base 21 to the wheel rim 26 is accomplished using threaded fasteners.

This embodiment can be enhanced by further comprising the step of providing a first and a second centrifugal-arm-travel-limit member 3A, 3B, associated with the first and second centrifugal arms 1A, 1B, respectively, wherein each centrifugal-arm-travel limit-member 3A, 3B is fixedly coupled to the mounting base 21.

This embodiment can be further enhanced wherein the step of providing a pressure-relief valve/regulator 17 comprises the steps of:

Providing a first air chamber 32, wherein the first air chamber 32 has connection points for two air-supply lines 11A, 11B and has a connection point for an air-discharge line 12;

Providing a second air chamber 33, wherein the second air chamber 33 has at least one opening to the atmosphere;

Providing a valve disc 30 with an associated valve seat 34, wherein the first and second air chambers 32, 33 are isolated from each other when the valve disc 30 is fully seated in the valve seat 34;

Providing an adjustable valve-seat-tension assembly 18, 28, 29 comprising a spring 29 disposed to exert seating force on the valve disc 30, a spring-compression interface member 28, and a spring-tension-adjustment screw 18, wherein the spring tension can be adjusted to change the pressure-relief-valve-opening setpoint; and Providing a bearing surface disposed above the first and second air chambers 32, 33 and around the housing of the adjustable valve-seat-tension assembly 27, 17, 31, wherein the bearing surface and the housing 27, 17, 31 of the adjustable valve-seat-tension assembly are adapted to receive and be rotatably coupled to the center mounting aperture of the connecting arm 16;

Wherein the pressure-relief valve/regulator 17 is adapted to direct excess air pressure from the first air chamber 32 to the second air chamber 33 when the valve disc 30 is lifted against said spring 29 tension.

This embodiment can be further enhanced wherein the step of providing a quick-disconnect device 13, 14, 36, 22 comprises the steps of:

Providing a quick-disconnect fitting member 13, wherein the quick-disconnect fitting 13 is fixedly and sealingly coupled to the third air-discharge line 12;

Providing a coupling nut 22;

Providing a flexible air-line segment 14 inserted through the coupling nut 22, wherein the flexible air-line segment 14 has an end flange adapted to sealingly couple with the coupling nut 22 when the coupling nut 22 is fully engaged with a tire fill/Schrader valve 41;

Providing an air-seal member 36, wherein the air-seal member 36 is disposed between the interior of the quick-disconnect fitting member 13 and the flexible air-line segment 14;

Wherein the end of the flexible air-line segment 14 not coupled with the coupling nut 22 is inserted through the quick-disconnect fitting member 13, including the air-seal member 36, and is inserted partially into the interior of the third air-discharge line 12; and Wherein the flexible air-line segment 14 is adapted to establish a sealed, interference fit with the third air-discharge line 12 during normal operations, yet allow the flexible air-line segment 14 to be pulled away from the third air-discharge line 12 in the event the mounting base 21 separates from the wheel 25, during rotating operations.

This embodiment can be further enhanced wherein the air-seal member 36 is comprised of rubber or an elastomer.

Third Embodiment—A Method for Using a Wheel-Mounted, Centrifugally Activated Air-Compressor Device Refer to FIGS. 1-6. This embodiment is directed generally to a method for using a wheel-mounted, centrifugally activated air-compressor. In one variation, the method comprises the steps of:

Obtaining a wheel-mounted, centrifugally activated air-compressor 23 according to First Embodiment or the Second Embodiment, described supra;

Installing the wheel-mounted, centrifugally activated air-compressor 23 onto a wheel rim 26, with the wheel rim 26 having an inflatable tire 25 installed around it;

Directly or indirectly connecting the wheel-mounted, centrifugally activated air-compressor's 23 air-discharge line 12, 13, 14, 36, 22 to the tire's fill/Schrader valve 41;

Using the wheel with the installed wheel-mounted, centrifugally activated air-compressor 23 by causing the wheel 25, 26 to rotate and stop at various intervals.

This embodiment can be further enhanced wherein the method is applied to a multiple-wheeled vehicle with inflatable tires, such as a passenger automobile, and wherein each wheel 25, 26 has its own installed wheel-mounted, centrifugally activated air compressor 23 according to the First Embodiment or the second Embodiment, described supra.

Alternative Embodiments and Other Variations

The various embodiments and variations thereof described herein and/or illustrated in the accompanying figures are merely exemplary and are not meant to limit the scope of the inventive disclosure. It should be appreciated that numerous variations of the invention have been contemplated as would be obvious to one of ordinary skill in the art with the benefit of this disclosure.

Hence, those ordinarily skilled in the art will have no difficulty devising myriad obvious variations and improvements to the invention, all of which are intended to be encompassed within the scope of the claims which follow.

What is claimed is:

1. An air-compressor for mounting and use on a wheel, comprising:
    a mounting base,
        wherein said mounting base is adapted to be coupled to the wheel rim of a wheel that comprises an inflatable tire;
    a first and a second air-compressor cylinder assembly, each said air-compressor cylinder assembly fixedly coupled to said mounting base and including:
        a cylinder housing,
        an air-intake valve that is spring-biased to be normally in the closed position,
        an air-discharge valve that is spring-biased to be normally in the closed position,
        a piston diametrically sized to closely fit inside of the bore of said cylinder housing, said piston coupled to a piston connecting rod, and
        a spring mechanically biased to oppose the compression piston stroke from said piston inserted into said cylinder bore;
    a first and a second centrifugal arm, each said centrifugal arm associated with said first and second cylinder housings, respectively, and including:
        a rotatable coupling at one end to said mounting base,
        a rotatable piston-drive coupling to an associated piston connecting rod,
        an inertial weight disposed on the opposite end relative to said end rotatably coupled to said mounting base,
        an elongated aperture disposed on the end associated with said inertial weight, and
        a coupling point adapted to receive one end of a biasing mechanism that is fixedly coupled to said mounting base and adapted to oppose centrifugal forces exerted against said inertial-weighted end of said centrifugal arm;

a connecting arm, centrally disposed on and rotatably coupled to said mounting base,
wherein each end of said connecting arm is slidably coupled to the elongated aperture of a centrifugal arm;

a first and a second air-discharge line, each coupled on one end to said first and second cylinder housing, respectively, and each coupled on the other end to a common pressure-relief valve;

a third air-discharge line coupled on one end to said pressure-relief valve and coupled on the other end to a quick-disconnect coupling adapted to couple to an inflatable-tire valve; and a counter-balance weight of substantially the same mass as said third air-discharge line and said quick-disconnect,
wherein said counter-balance weight is disposed on said mounting base on the opposite side relative to said third air-discharge line and said quick-disconnect such that the potential for harmonics during wheel rotation are mitigated.

2. The air compressor of claim 1, further comprising an enclosure housing that is sized and shaped to cover the air-compressor components on said mounting base such that said enclosed air compressor is detachably mountable over the rim of a wheel.

3. The air compressor of claim 2, wherein said enclosure housing is coupled to said mounting base and said wheel rim using a plurality of fasteners selected from the group comprising metal clips and threaded fasteners.

4. The air compressor of claim 2, wherein said enclosure housing further comprises at least one centrifugally activated vent port, each said centrifugally activated vent port comprising:

at least one pivotable vent port cover,
wherein each of said pivotable vent port covers' pivot point is fixed on said enclosure housing, and
wherein each of said pivotable vent port covers has a centrifugal weight coupled to the distal end of said pivotable vent covers, relative to the portion that actually covers a port opening in said enclosure housing; and at least one port-closing spring,
wherein each said port-closing spring is coupled to the centrifugal-weighted end of at least one said pivotable vent port cover, and biases said pivotable vent port cover in the closed position.

5. The air compressor of claim 4, wherein each of said vent port openings of said enclosure housing has air-filter media adapted to entrap dust and other debris from the incoming air stream during wheel-rotating operations.

6. The air compressor of claim 1, wherein said counter-balance weight is an effective amount of tubing substantially equal to the amount and mass of said third air-discharge line and said quick-disconnect.

7. The air compressor of claim 1, wherein said coupling of said mounting base to said wheel rim is accomplished using a plurality of fasteners selected from the group comprising metal clips adapted to create an interference fit with said wheel rim and threaded fasteners.

8. The air compressor of claim 7, wherein the plurality of fasteners used to secure said mounting base to said wheel rim is a plurality of metal clips, and further comprising a spring retention ring in conjunction with said plurality of metal clips, said spring retention ring coupled to the interior side of each metal clip in order to exert outward force to enhance the coupling to said wheel rim.

9. The air compressor of claim 1, further comprising a first and a second centrifugal-arm-travel-limit member, each associated with said first and second centrifugal arms, respectively,
wherein each said centrifugal-arm-travel limit-member is fixedly coupled to said mounting base.

10. The air compressor of claim 1, wherein said pressure-relief valve comprises:
a first air chamber,
wherein said first air chamber has connection points for two air-supply lines and has a connection point for an air-discharge line;
a second air chamber,
wherein said second air chamber has at least one opening to the atmosphere;
a valve disc and an associated valve seat,
wherein said first and second air chambers are isolated from each other when said valve disc is fully seated in said valve seat;
an adjustable valve-seat-tension assembly comprising a spring disposed to exert seating force on said valve disc, a spring-compression interface member, and a spring-tension-adjustment screw,
wherein said spring tension can be adjusted to change the pressure-relief-valve-opening setpoint; and
a bearing surface disposed above said first and second air chambers and around the housing of said adjustable valve-seat-tension assembly,
wherein said bearing surface and said housing of said adjustable valve-seat-tension assembly are adapted to receive and be rotatably coupled to the center mounting aperture of said connecting arm;
wherein said pressure-relief valve is adapted to direct excess air pressure from said first air chamber to said second air chamber when said valve disc is lifted against said spring tension.

11. The air compressor of claim 1, wherein said quick-disconnect device comprises:
a quick-disconnect fitting member,
wherein said quick-disconnect fitting is fixedly and sealingly coupled to said third air-discharge line;
a coupling nut;
a flexible air-line segment inserted through said coupling nut,
wherein said flexible air-line segment has an end flange adapted to sealingly couple with said coupling nut when said coupling nut is fully engaged with a tire fill valve; and
an air-seal member,
wherein said air-seal member is disposed between the interior of said quick-disconnect fitting member and said flexible air-line segment;
wherein the end of said flexible air-line segment not coupled with said coupling nut is inserted through said quick-disconnect fitting member, including said air-seal member, and is inserted partially into the interior of said third air-discharge line; and
wherein said flexible air-line segment is adapted to establish a sealed, interference fit with said third air-discharge line during normal operations, yet allow said flexible air-line segment to be pulled away from said third air-discharge line in the event said mounting base separates from said wheel during rotating operations.

12. The air compressor of claim 11, wherein said air-seal member is comprised of rubber or an elastomer.

13. A method of making an air-compressor for mounting and use on a wheel, comprising the steps of:
  providing a mounting base,
    wherein said mounting base is adapted to be coupled to the wheel rim of a wheel that comprises an inflatable tire;
  providing a first and a second air-compressor cylinder assembly, each said air-compressor cylinder assembly fixedly coupled to said mounting base and including:
    a cylinder housing,
    an air-intake valve that is spring-biased to be normally in the closed position,
    an air-discharge valve that is spring-biased to be normally in the closed position,
    a piston diametrically sized to closely fit inside of the bore of said cylinder housing, said piston coupled to a piston connecting rod, and
    a spring mechanically biased to oppose the compression piston stroke from said piston inserted into said cylinder bore;
  providing a first and a second centrifugal arm, each said centrifugal arm associated with said first and second cylinder housings, respectively, and including:
    a rotatable coupling at one end to said mounting base,
    a rotatable piston-drive coupling to an associated piston connecting rod,
    an inertial weight disposed on the opposite end relative to said end rotatably coupled to said mounting base,
    an elongated aperture disposed on the end associated with said inertial weight, and
    a coupling point adapted to receive one end of a biasing mechanism that is fixedly coupled to said mounting base and adapted to oppose centrifugal forces exerted against said inertial-weighted end of said centrifugal arm;
  providing a connecting arm, centrally disposed on and rotatably coupled to said mounting base,
    wherein each end of said connecting arm is slidably coupled to the elongated aperture of a centrifugal arm;
  providing a pressure-relief valve;
  providing a first and a second air-discharge line, each coupled on one end to said first and second cylinder housing, respectively, and each coupled on the other end to said pressure-relief valve;
  providing a third air-discharge line coupled on one end to said pressure-relief valve and coupled on the other end to a quick-disconnect coupling adapted to couple to an inflatable-tire valve; and
  providing a counter-balance weight of substantially the same mass as said third air-discharge line and said quick-disconnect,
    wherein said counter-balance weight is disposed on said mounting base on the opposite side relative to said third air-discharge line and said quick-disconnect such that the potential for harmonics during wheel rotation are mitigated.

14. The method of claim 13, further comprising the step of providing an enclosure housing that is sized and shaped to cover the air-compressor components on said mounting base such that said enclosed air compressor is detachably mountable over the rim of a wheel.

15. The method of claim 14, further comprising the step of providing said enclosure housing with at least one centrifugally activated vent port, each said centrifugally activated vent port comprising:
  at least one pivotable vent port cover,
    wherein each of said pivotable vent port covers' pivot point is fixed on said enclosure housing, and
    wherein each of said pivotable vent port covers has a centrifugal weight coupled to the distal end of said pivotable vent covers, relative to the portion that actually covers a port opening in said enclosure housing; and
  at least one port-closing spring,
    wherein each said port-closing spring is coupled to the centrifugal-weighted end of at least one said pivotable vent port cover, and biases said pivotable vent port cover in the closed position.

16. The method of claim 15, further comprising the step of providing, for each of said port openings of said enclosure housing, air-filter media adapted to entrap dust and other debris from the incoming air stream during wheel-rotating operations.

17. The method of claim 13, wherein said counter-balance weight is an effective amount of tubing substantially equal to the amount and mass of said third air-discharge line and said quick-disconnect.

18. The method of claim 13, wherein providing said pressure-relief valve comprises the steps of:
  providing a first air chamber,
    wherein said first air chamber has connection points for two air-supply lines and has a connection point for an air-discharge line;
  providing a second air chamber,
    wherein said second air chamber has at least one opening to the atmosphere;
  providing a valve disc and an associated valve seat,
    wherein said first and second air chambers are isolated from each other when said valve disc is fully seated in said valve seat;
  providing an adjustable valve-seat-tension assembly comprising a spring disposed to exert seating force on said valve disc, a spring-compression interface member, and a spring-tension-adjustment screw,
    wherein said spring tension can be adjusted to change the pressure-relief-valve-opening setpoint; and
  providing a bearing surface disposed above said first and second air chambers and around the housing of said adjustable valve-seat-tension assembly,
    wherein said bearing surface and said housing of said adjustable valve-seat-tension assembly are adapted to receive and be rotatably coupled to the center mounting aperture of said connecting arm;
  wherein said pressure-relief valve is adapted to direct excess air pressure from said first air chamber to said second air chamber when said valve disc is lifted against said spring tension.

19. The method of claim 13, wherein providing said quick-disconnect device comprises the steps of:
  providing a quick-disconnect fitting member,
    wherein said quick-disconnect fitting is fixedly and sealingly coupled to said third air-discharge line;
  providing a coupling nut;
  providing a flexible air-line segment inserted through said coupling nut,
    wherein said flexible air-line segment has an end flange adapted to sealingly couple with said coupling nut when said coupling nut is fully engaged with a tire fill valve; and
  providing an air-seal member, wherein said air-seal member is disposed between the interior of said quick-disconnect fitting member and said flexible air-line segment;

wherein the end of said flexible air-line segment not coupled with said coupling nut is inserted through said quick-disconnect fitting member, including said air-seal member, and is inserted partially into the interior of said third air-discharge line; and wherein said flexible air-line segment is adapted to establish a sealed, interference fit with said third air-discharge line during normal operations, yet allow said flexible air-line segment to be pulled away from said third air-discharge line in the event said mounting base separates from said wheel during rotating operations.

20. A method of using a wheel-mounted, centrifugally activated air-compressor, the method comprising the steps of:

obtaining a wheel-mounted, centrifugally activated air-compressor according to claim 1;

installing said wheel-mounted, centrifugally activated air-compressor onto a wheel rim, with said wheel rim having an inflatable tire installed around it;

directly or indirectly connecting said wheel-mounted, centrifugally activated air-compressor's air-discharge line to said tire's fill valve; and using said wheel with said installed wheel-mounted, centrifugally activated air-compressor by causing said wheel to rotate and stop at various intervals.

* * * * *